US008744368B2

United States Patent
Kothari et al.

(10) Patent No.: US 8,744,368 B2
(45) Date of Patent: Jun. 3, 2014

(54) INTEGRATED CIRCUIT WITH AN ADAPTABLE CONTACT PAD RECONFIGURING ARCHITECTURE

(75) Inventors: Love Kothari, Sunnyvale, CA (US); James Bennett, Hroznetin (CZ); Zhongmin Zhang, Fremont, CA (US)

(73) Assignee: Broadcom Corporation, Irvine, CA (US)

(*) Notice: Subject to any disclaimer, the term of this patent is extended or adjusted under 35 U.S.C. 154(b) by 218 days.

(21) Appl. No.: 13/340,873

(22) Filed: Dec. 30, 2011

(65) Prior Publication Data

US 2013/0043939 A1 Feb. 21, 2013

Related U.S. Application Data

(60) Provisional application No. 61/524,538, filed on Aug. 17, 2011.

(51) Int. Cl.
*H04B 17/00* (2006.01)

(52) U.S. Cl.
USPC .... 455/67.11; 455/67.14; 455/78; 455/115.1; 455/314; 455/323; 455/80; 455/118; 375/224; 375/349; 327/564

(58) Field of Classification Search
USPC ......... 455/67.11, 78, 67.14, 80, 84, 118, 333, 455/207, 314, 323, 226.1, 115.1, 115.2; 375/224, 349; 327/564
See application file for complete search history.

(56) References Cited

U.S. PATENT DOCUMENTS

| | | | | |
|---|---|---|---|---|
| RE37,500 E | * | 1/2002 | Lee | 324/762.02 |
| 6,771,087 B1 | * | 8/2004 | Oz et al. | 324/762.02 |
| 7,307,442 B2 | * | 12/2007 | Ong | 324/750.01 |
| 7,309,999 B2 | * | 12/2007 | Ong | 324/750.3 |
| 7,313,740 B2 | * | 12/2007 | Ong | 714/718 |
| 7,424,654 B2 | * | 9/2008 | Burke et al. | 714/724 |
| 7,561,855 B2 | * | 7/2009 | Hofmeister et al. | 455/88 |
| 7,567,758 B2 | * | 7/2009 | Aronson et al. | 398/135 |
| 7,613,393 B2 | * | 11/2009 | Aronson et al. | 398/16 |
| 7,773,964 B2 | * | 8/2010 | Ozaki et al. | 455/226.1 |
| 7,995,927 B2 | * | 8/2011 | Aronson et al. | 398/135 |
| 8,286,046 B2 | * | 10/2012 | Ong | 714/738 |
| 8,467,756 B2 | * | 6/2013 | Ozaki et al. | 455/226.1 |

* cited by examiner

*Primary Examiner* — Marceau Milord
(74) *Attorney, Agent, or Firm* — Sterne, Kessler, Goldstein & Fox P.L.L.C.

(57) ABSTRACT

An apparatus and method are disclosed for providing test mode contact pad reconfigurations that expose individual internal functional modules or block groups in an integrated circuit for testing and for monitoring. A plurality of switches between each functional module switches between passing internal signals among the blocks and passing in/out signals external to the block when one or more contact pads are strapped to input a pre-determined value. Another set of switches between the functional modules and input/output contact pads switch between functional inputs to and from the functional modules and monitored signals or input/output test signals according to the selected mode of operation.

20 Claims, 13 Drawing Sheets

INTEGRATED CIRCUIT WITH AN ADAPTABLE CONTACT PAD RECONFIGURING ARCHITECTURE

CROSS-REFERENCE TO RELATED APPLICATIONS

This patent application claims the benefit of U.S. Provisional Patent Application No. 61/524,538, filed Aug. 17, 2011, which is incorporated herein by reference in its entirety.

FIELD OF DISCLOSURE

The present disclosure relates generally to monitoring and testing of integrated circuits.

BACKGROUND

Related Art

In a system-on-chip (SoC) or integrated circuit configuration, integrating a radio-frequency (RF) block with a baseband (BB) block provides several unique challenges. Among them includes various testing difficulties. One testing difficulty includes testing internal signals between these and other integrated blocks. In the past, testing of signals between such blocks as the RF block and the BB block was easier because the signals were in discrete chips whose interconnections were accessible to an external monitor. Another testing difficulty arises when attempting to test individual blocks of an integrated circuit or SoC when other signals outside of the block under testing interfere with the testing indirectly or directly. Certain integrated circuits often include built-in self-test (BIST) hardware to provide internal testing functionality of the circuit. BIST seeks to reduce manufacturing test complexity while reducing cost and the need for external test equipment.

In addition, pin count has become an increasingly expensive issue in the design and manufacture of integrated circuits due to chip packaging constraints. This is because there are now more functions and corresponding signals that must pass in and out of the integrated circuit than have previously been provided. Attempts to provide isolated testing capability to the internal functional modules mentioned above, as well as monitoring of purely internal signals between functional modules, could easily add to the already-crowded pin count of a modern integrated circuit.

Thus, there is a need for an apparatus that enables isolation and testing of individual functional modules in an integrated circuit while not adding to the number of pins of the overall chip package. Further aspects and advantages of the present disclosure will become apparent from the detailed description that follows.

BRIEF DESCRIPTION OF THE DRAWINGS/FIGURES

The present disclosure is described with reference to the accompanying drawings. In the drawings, like reference numbers generally indicate identical, functionally similar, and/or structurally similar elements. Additionally, the left most digit(s) of a reference number identifies the drawing in which an element first appears.

DETAILED DESCRIPTION

Figure 1:
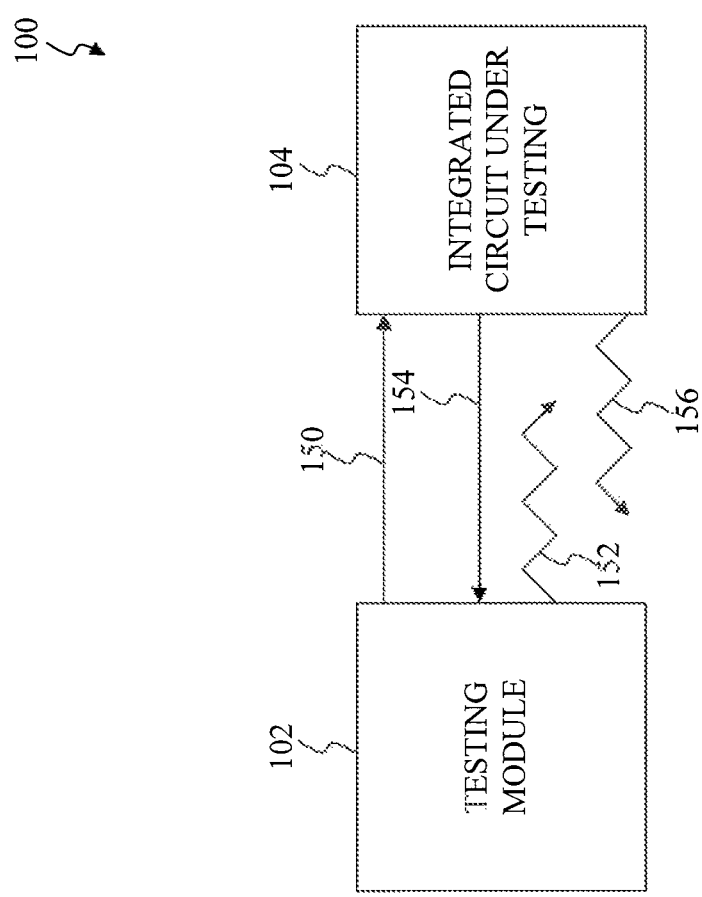
FIG. 1 illustrates a block diagram of an integrated circuit testing environment according to an exemplary embodiment of the present disclosure.

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to effect such feature, structure, or characteristic in connection with other exemplary embodiments whether or not explicitly described.

The exemplary embodiments described herein are provided for illustrative purposes and are not limiting. Other exemplary embodiments are possible, and modifications may be made to the exemplary embodiments within the spirit and scope of the disclosure. Therefore, the Detailed Description is not meant to limit the disclosure. Rather, the scope of the disclosure is defined only in accordance with the following claims and their equivalents.

Embodiments of the disclosure may be implemented in hardware, firmware, software, or any combination thereof.

Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, and instructions may be described herein as performing certain actions. However, it should be appreciated that such descriptions are merely for convenience and that such actions in fact result from computing devices, processors, controllers, or other devices executing the firmware, software, routines, instructions, etc.

For purposes of this discussion, the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the disclosure that others can, by applying knowledge of those skilled in the relevant art(s), readily modify and/or adapt for various applications such exemplary embodiments, without undue experimentation, without departing from the spirit and scope of the present disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Exemplary Testing Environment

FIG. 1 illustrates a block diagram of an integrated circuit testing environment according to an exemplary embodiment of the present disclosure. A testing module 102 interfaces with an integrated circuit under testing (IUT) 104 to test and/or monitor its functionality The IUT 104 may be any type of integrated circuit that typically undergoes testing before delivery to a customer or end user and is suited for testing, as will be recognized by one skilled in the relevant art(s). Some specific, non-limiting examples include Systems-on-Chip (SoCs), printed circuit boards, microprocessors, or components of the same such as power management units, memory, controllers, and digital logic.

Typically, the IUT 104 may be characterized as performing various functions using various functional modules in a normal mode of operation. In a testing mode of operation, the IUT 104 may be configured to test one or more of the functional modules or combinations of the functional modules to determine whether the IUT 104, or portions thereof, operates as expected.

As shown in FIG. 1, the testing module 102 may provide a wired communications signal 150 and/or a wireless communications signal 152 for testing of the IUT 104. The testing module 102 provides the wired communications signal 150 over a communications cable to the IUT 104. The communications cable may represent a coaxial cable, a copper conductor, a fiber optic cable or any other suitable wired connection that will be apparent to those skilled in the relevant art(s). The testing module 102 provides the wireless communications signal 152 over a communications channel to the IUT 104. The testing module 102 may use any suitable combination of the wired communications signal 150 and/or the wireless communications signal 152 in the testing mode of operation.

The wired communications signal 150 and/or the wireless communications signal 152 may cause the IUT 104 to enter into the testing mode of operation. In the testing mode of operation, the IUT 104 may reallocate one or more contact pads that are typically used in the normal mode of operation to interface other integrated circuits for use in the testing mode of operation. For example, the IUT 104 may reallocate the one or more contact pads from being in a first state, such as an output state, input state, or tri-state to provide some examples, to be in a second state, such as the output state, the input state, or the tri-state.

Additionally, the IUT 104 may configure one or more of its various functional modules for testing in response to the wired communications signal 150 and/or the wireless communications signal 152. For example, the IUT 104 may isolate one or more of its functional modules from other functional modules to perform a testing routine. As another example, the IUT 104 may dynamically reconfigure various couplings between its functional modules, as well as other functional modules from other integrated circuits, to perform the testing routine. The testing routine may be provided by the testing module 102 using the wired communications signal 150 and/or the wireless communications signal 152 or alternatively, stored within one of the functional modules of the IUT 104. In this alternative, the reallocation of the one or more contact pads and/or the dynamical reconfiguration of the various couplings may occur in response to instructions from the IUT 104.

Further, the wired communications signal 150 and/or the wireless communications signal 152 may include one or more instructions and/or one or more parameters to be used by the IUT 104 in the testing mode of operation. The one or more instructions and/or one or more parameters may include configuration information for the functional modules, one or more instructions of the testing routine, parameters, such as pattern data to provide an example, to be used by the testing routine, configuration information for the one or more contact pads, and/or any other suitable instruction and/or parameter that may be used by the IUT 104 in the testing mode of operation and/or the monitoring mode of operation that will be apparent to those skilled in the relevant art(s) from the teachings herein without departing from the spirit and scope of the present disclosure.

As additionally shown in FIG. 1, the IUT 104 may provide a wired communication signal 154 and/or a wireless communication signal 156 in the testing mode of operation. The wired communication signal 154 and/or the wireless communication signal 156 may indicate one or more outcomes of the testing mode of operation to the testing module 102. For example, the wired communication signal 154 and/or the wireless communication signal 156 may be used to communicate one or more waveforms and/or one or more signal metrics of the one or more waveforms that are produced in the testing mode of operation. Alternatively, the wired communication signal 154 and/or the wireless communication signal 156 may indicate whether the IUT 104, or portions thereof, operates as expected.

In an exemplary embodiment, the wired communication signal 154 and/or the wireless communication signal 156 may be used to provide one or more signals to the testing module 102 for monitoring while the IUT 104 is operating the normal mode of operation, which may be desirable to observe internal signals between various functional modules of the IUT 104 as well as functional modules of other integrated circuits.

While the above and following discussion describes the IUT 104 as being a circuit in the testing environment 100, it should be understood that it is by way of example and should not be considered to limit the present disclosure to only that environment. As will become clear in the discussion below and as will be recognized by one skilled in the relevant art(s), the IUT 104 may be an integrated circuit or other type of circuit in any suitable mode of operation, including the testing mode of operation and the normal mode of operation.

It should be noted that FIG. 1, as well as the rest of the figures of the present application, represent block diagrams of various aspects of the present disclosure. Those skilled in the relevant art(s) will recognize that not all interconnections to and from all of the functional modules are shown for sake of simplicity, but will be easily recognizable.

Exemplary Testing Equipment

Figure 2:
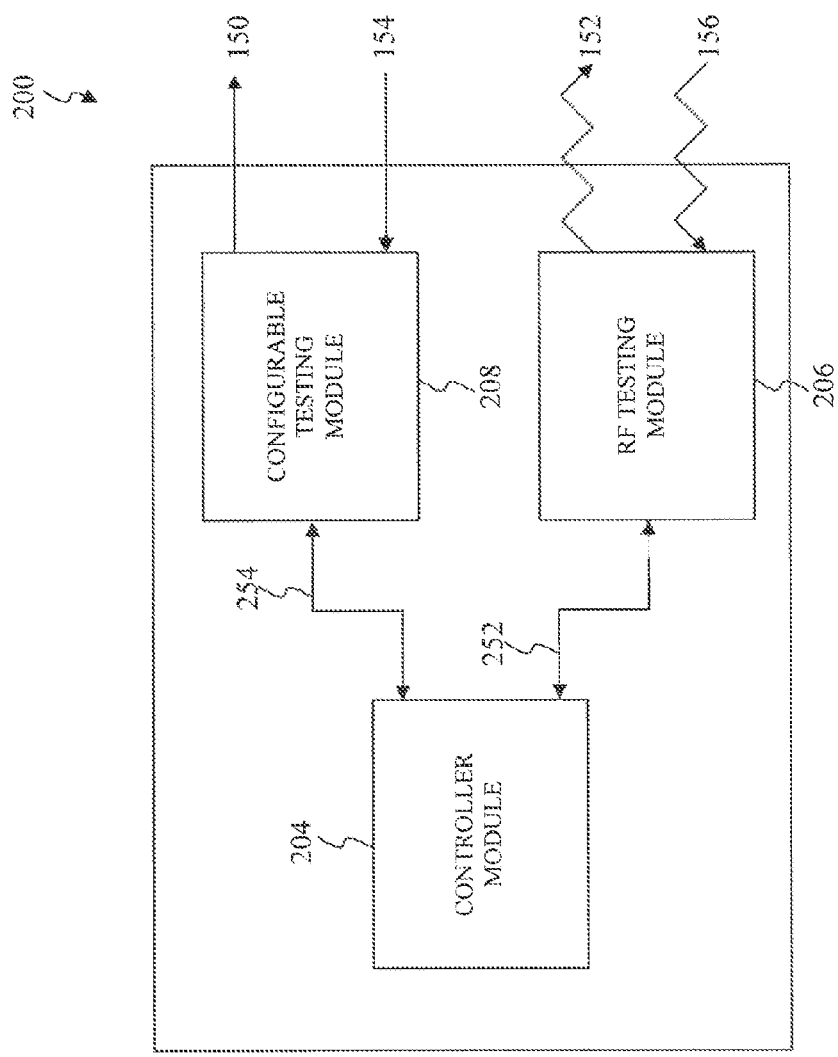
FIG. 2 illustrates a block diagram of exemplary testing equipment that may be used in the integrated circuit testing environment according to an exemplary embodiment of the present disclosure.

FIG. 2 illustrates a block diagram of exemplary testing equipment that may be used in the integrated circuit testing environment according to an exemplary embodiment of the present disclosure. A testing equipment 200 is configured to cause an IUT, such as the IUT 104 to provide an example, to enter into a testing mode of operation. In the testing mode of operation, the testing equipment 200 tests one or more functional modules or combinations of the functional modules of the IUT to determine whether the IUT, or portions thereof, operates as expected. The testing equipment 200 includes a controller module 204, a radio frequency (RF) testing module 206, and a configurable testing module 208. The testing equipment 200 may represent an exemplary embodiment of the testing module 102.

The controller module 204 controls overall configuration and operation of the testing equipment 200 and may control overall configuration and operation of the IUT as well. In the testing mode of operation, the controller module 204 executes various combinations of one or more instructions optionally using one or more parameters to faun a testing routine to determine whether the IUT, or portions thereof, operates as expected. The one or more instructions and/or one or more parameters may include configuration information for the various functional modules of the IUT, one or more instructions of a testing routine, parameters to be used by the testing routine, such as pattern data to provide an example, and/or any other suitable instruction and/or parameter that may be used by the JUT in the testing mode of operation and/or the monitoring mode of operation that will be apparent to those skilled in the relevant art(s) from the teachings herein without departing from the spirit and scope of the present disclosure.

The controller module 204 may provide these other instructions and/or parameters to the JUT in the testing mode of operation. Specifically, the controller module 204 may send and/or receive wireless information 252 to/from the RF testing module 206 and/or wired information 254 to/from the configurable testing module 208. The controller module 204 may provide configuration information to be used by the RF testing module 206 as wireless information 252 and/or by the configurable testing module 208 as wired information 254, respectively. After configuration of the RF testing module 206 and/or the configurable testing module 208, the controller module 204 may send instructions and/or parameters of the testing routine to the IUT via the wireless information 252 and/or the wired information 254. Alternatively, the testing routine itself may be stored in the IUT. In this situation, the controller module 204 may send instructions to the IUT to execute the testing routine and/or parameters to be used by the testing routine. Afterwards, the controller module 204 may receive one or more outcomes in response to the instructions and/or parameters of the testing routine as the wireless information 252 and/or the wired information 254.

In the monitoring mode of operation, the controller module 204 may monitor one or more signals of the JUT to evaluate the performance of various functional modules of the JUT as well as functional modules of other integrated circuits. The controller module 204 executes the various combinations of the one or more instructions and/or the parameters to configure the testing equipment and/or the IUT to monitor the one or more signals of the IUT. The one or more instructions may include instructions to measure one or more signal metrics of the one or more signals of the one or more function modules, or combinations of function modules, of the IUT. The one or more parameters may include one or more thresholds that may be used to monitor the performance of various functional modules of the IUT or functional modules of other integrated circuits.

The RF testing module 206 provides the wireless communications signal 152 in response to the wireless information 252. For example, the RF testing module 206 may upconvert, modulate, and/or encode the instructions and/or parameters from the wireless information 252 in accordance with the configuration information from the wireless information 252. Similarly, the RF testing module 206 provides the wireless information 252 in response to the wireless communication signal 156. For example, the RF testing module 206 may downconvert, demodulate, and/or decode the one or more outcomes from the wireless communication signal 156, such as the one or more outcomes in the testing mode of operation or the one or more signals of the IUT in the monitoring mode of operation, to provide the wireless information 252. Typically, the RF testing module 206 is used to wirelessly communicate with the IUT when one of the functional modules of the IUT includes wireless communication capabilities, otherwise the testing equipment 200 communicates with the IUT using the configurable testing module 208.

The configurable testing module 208 provides the wired communications signal 150 in response to the wired information 254. For example, the configurable testing module 208 includes various reconfigurable couplings to couple the controller module 204 to various contact pads of the IUT. The configurable testing module 208 configures these various couplings in accordance with the configuration information from the wired information 254 to form one or more signal pathways between the controller module 204 and the contact pads of the IUT. The configurable testing module 208 provides the instructions and/or parameters in the testing mode of operation and/or the monitoring mode of operation from the wired information 254 to the IUT using these signal pathways via the wired communications signal 150. Similarly, the configurable testing module 208 provides the wired information 254 in response to the wired response signal 154. For example, the configurable testing module 208 may provide the one or more outcomes in the testing mode of operation or the one or more signals of the IUT in the monitoring mode of operation from the wired response signal 154 to the controller module 204 using the one or more signal pathways in accordance with the configuration information.

Exemplary Integrated Circuit Under Testing (IUT)

Figure 3:
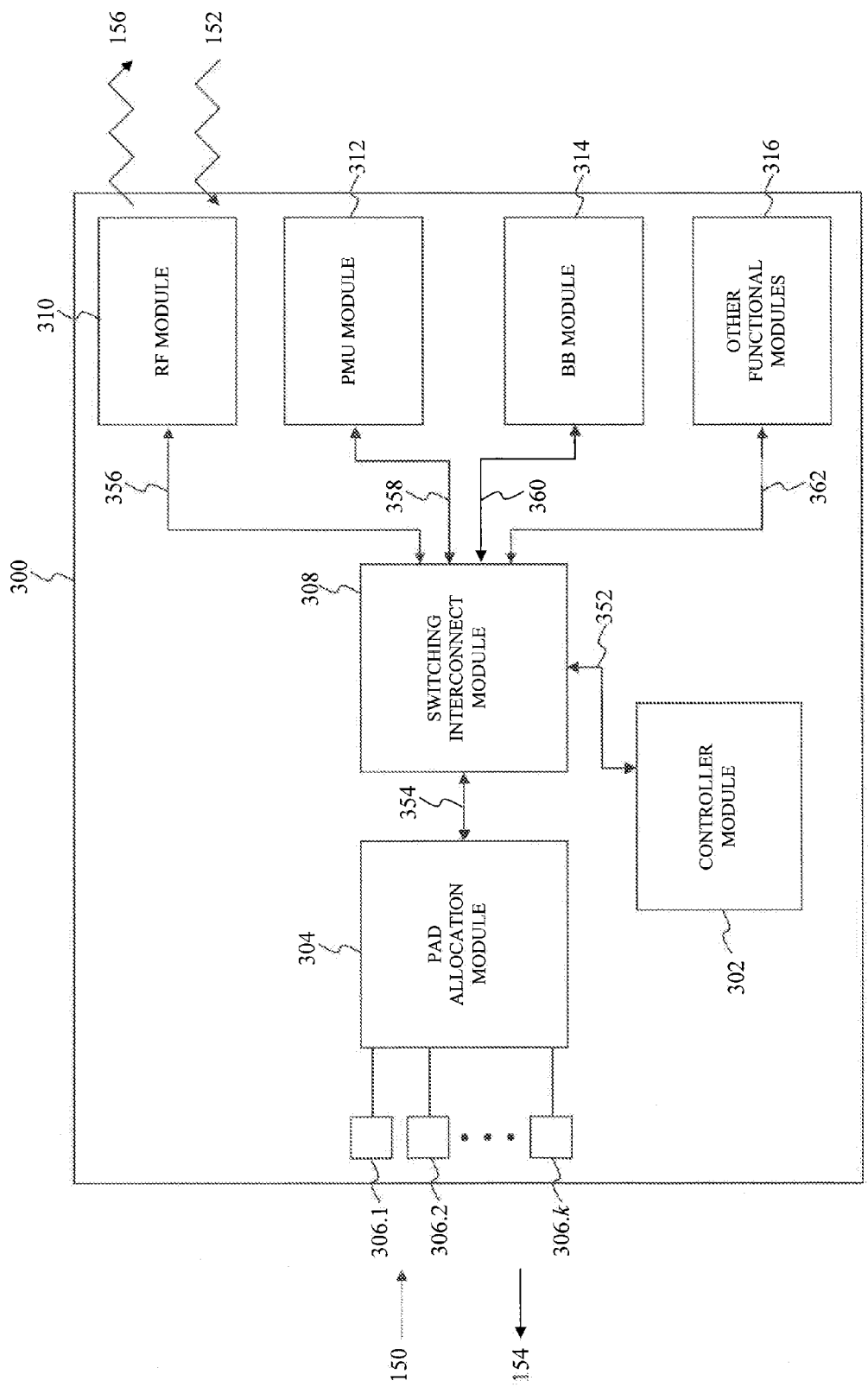
FIG. 3 illustrates a block diagram of exemplary integrated circuit under testing (IUT) that may be used in the integrated circuit testing environment according to an exemplary embodiment of the present disclosure.

FIG. 3 illustrates a block diagram of an exemplary integrated circuit under testing (IUT) that may be used in the integrated circuit testing environment according to an exemplary embodiment of the present disclosure. An IUT 300 executes one or more instructions optionally using one or more parameters from testing equipment, such as the testing module 102 or the testing equipment 200 to provide some examples, in a testing mode of operation. Alternatively, the IUT 300 provides one or more signals to the testing equipment in a monitoring mode of operation. The IUT 300 includes a controller module 302, a pad allocation module 304, configurable contact pads 306.1 through 306.$k$, a switching interconnect module 308, a radio frequency (RF) module 310, a power management unit (PMU) module 312, a baseband (BB) module 314, and other functional modules 316. However, those skilled in the relevant art(s) will recognize that the IUT 300 need not include all of these functional modules without departing from the spirit and scope of the present disclosure. For example, in an exemplary embodiment, the IUT 300 may not include the pad allocation module 304, and the configurable contact pads 306.1 through 306.$k$. In this exemplary embodiment, the IUT 300 communicates with the testing equipment using the RF module 310. As another example, in another exemplary embodiment, the IUT 300 may not include the RF module 310. In this exemplary embodiment, the IUT 300 communicates with the testing equipment using the pad allocation module 304, and the configurable contact pads 306.1 through 306.$k$.

The controller module 302, the pad allocation module 304, the switching interconnect module 308, the RF module 310, the PMU module 312, and the BB module 314 may be formed onto a single die, substrate, or printed circuit board (PCB). Alternatively, at least two of the controller module 302, the pad allocation module 304, the switching interconnect module 308, the RF module 310, the PMU module 312, and the BB module 314 may be formed onto a single die, substrate, or PCB that is coupled to another die, substrate, or PCB having other functional modules of the IUT 300.

The controller module 302 controls overall configuration and operation of the IUT 300 and may control overall configuration and operation of other electrical, mechanical, and/or electro-mechanical circuits that are communicatively coupled to the IUT 300. The controller module 302 executes one or more instructions optionally using one or more parameters to provide contact pad configuration information interconnect information for the switching interconnect module 308 via a first signal pathway 352. The first signal pathway 352, and/or other signal pathways to be described below represent bidirectional pathways that allow various functional modules of the IUT 300 to send and to receive information. The controller module 302 may provide the one or more instructions and/or the one or more parameters to various functional modules of the IUT 300 via the first signal pathway 352. For example, the one or more parameters may represent pattern data that is be used for testing of one or more of the functional modules of the UT 300. In this example, the controller module 302 may provide the pattern data to these functional modules using the first signal pathway 352 in the testing mode of operation. As another example, the controller module 302 may provide the one or more instructions and/or the one or more parameters using the first signal pathway 352 to configure the IUT 300 to provide one or more signals to the testing equipment for monitoring in the monitoring mode of operation.

The controller module 302 may configure the IUT 300 to enter in a slave mode of operation to respond to instructions and/or parameters from other devices, such as the testing equipment or other electrical, mechanical, and/or electro-mechanical circuits to provide some examples, or a master mode of operation to control overall configuration and operation of the IUT 300 and, optionally, overall configuration and operation of other electrical, mechanical, and/or electro-mechanical circuits as well. In the slave mode of operation, the controller module 302 receives the one or more instructions and, optionally, the one or more parameters from the testing equipment from the wired communications signal 150 and/or from the wireless communications signal 152 via the first signal pathway 352. However, the controller module 302 may store the one or more instructions and, optionally, the one or more parameters within an internal memory and retrieve the one or more instructions and/or the one or more parameters from the internal memory in the master mode of operation. The controller module 302 may execute the one or more instructions and, optionally, the one or more parameters and/or provide the one or more instructions and, optionally, the one or more parameters to other electrical, mechanical, and/or electro-mechanical circuits as well in the master mode of operation.

In the testing mode of operation, the controller module 302 may receive results from the various functional modules in response to the one or more instructions and/or the one or more parameters when operating in the slave mode of operation and/or the master mode of operation. The controller module 302 may compare these results to predetermined results to determine whether one or more of the various functional modules operate as expected. The controller module 302 may communicate this comparison to the testing equipment via the first signal pathway 352. Alternatively, the controller module 302 may communicate the results from the various functional modules themselves to the testing equipment for evaluation.

The pad allocation module 304 configures and arranges the configurable contact pads 306.1 through 306.$k$ in response to configuration information from the first signal pathway 352. For example, the pad allocation module 304 may include full input/output circuitry capable of setting the configurable contact pads 306.1 through 306.$k$ to support any type of pad input, output, and input/output, complete with pull-up/pull-down circuitry, electrostatic discharge (ESD) circuitry, buffers, tri-state switches, and open drain switches. In this example, the pad allocation module 304 setting an operation of the configurable contact pads 306.1 through 306.$k$ in response to the configuration information. The pad allocation module 304 may additionally arrange various connections between the configurable contact pads 306.1 through 306.$k$ and various functional modules of the IUT 300. For example, the pad allocation module 304 may dynamically reconfigure one of the configurable contact pads 306.1 through 306.$k$ from being coupled to a first functional module from among the various functional modules of the IUT 300 to be coupled to a second functional module from among the various functional modules of the IUT 300. The pad allocation module 304 may provide information from various functional modules of the JUT 300 via the first signal pathway 352 or a second signal pathway 354.

The configurable contact pads 306.1 through 306.$k$ represent couplings between the IUT 300 and other electrical, mechanical, and/or electro-mechanical circuits, such as the testing equipment and/or other integrated circuits to provide some examples. The one or more configurable contact pads 306.1 through 306.$k$ may be coupled to one or more pins, one or more solder balls, one or more leads, and/or to any other suitable coupling that may be used to electrically couple the IUT 300 to other electrical, mechanical, and/or electro-mechanical circuits that will be apparent to those skilled in the relevant art(s) without departing from the spirit and scope of the present disclosure.

Typically, one or more of the configurable contact pads 306.1 through 306.k are coupled to these other electrical, mechanical, and/or electro-mechanical circuits via one or more communication cables, such as a coaxial cable, a copper conductor, a fiber optic cable or any other suitable wired connection that will be apparent to those skilled in the relevant art(s), to receive the wired communications signal 150. These contact pads or other contact pads from among the configurable contact pads 306.1 through 306.k may be coupled to these other electronic circuits via the one or more communication cables or other communication cables to provide the wired communication signal 154. In an exemplary embodiment, two or more of the configurable contact pads 306.1 through 306.k may be strapped from their normal mode of operation as contact pads for various functional modules within the IUT 300. For example, two or more of the configurable contact pads 306.1 through 306.k t be strapped to cause the IUT 300 to enter into one of the testing, the normal, or the monitoring modes of operation. Strapping of the contact pads denotes specifically configuring the contact pads in a manner to select some pre-determined, built-in functionality of the IUT 300. Strapping may occur via a signal, such as the wired communication signal 150 to provide an example, or alternatively by some physical change to these strapped contact pads, such as placement of a header or switch on these strapped contact pads, upon power up of the IUT 300.

The switching interconnect module 308 configures and arranges one or more couplings between the functional i-nodules of the IUT 300 in response to configuration information from the first signal pathway 352. Typically, the switching interconnect module 308 may couple functional modules of the IUT 300 to other functional modules of the IUT 300 by configuring various signal pathways. For example, the switching interconnect module 308 may configure the second signal pathway 354 to be coupled to one or more of the first signal pathway 352, a third signal pathway 356, a fourth signal pathway 358, a fifth signal pathway 360 and/or a sixth signal pathway 362. However, this example is not limiting, those skilled in the relevant art(s) will recognize that the switching interconnect module 308 may configure corresponding signal pathways of any functional module of the IUT 300 to be coupled to other corresponding signal pathways of other functional module of the IUT 300 without departing from the spirit and scope of the present disclosure. The switching interconnect module 308 may couple each signal pathway to more than one functional module of the IUT 300 when appropriate.

Tne RF module 310 downconverts, demodulates, and/or decodes the wireless communications signal 152 to provide a recovered communications sequence via the third signal pathway 356. The RF module 310 may convert the wireless communications signal 152 from an analog representation to a digital representation. The RF module 310 upconverts, modulates, and/or encodes a transmission sequence from the third signal pathway 356 to provide the wireless communications signal 156. The RF module 310 may convert the transmission sequence from a digital representation to an analog representation. The RF module 310 may execute the one or more instructions optionally using the one or more parameters provided by the controller module 302 and provide results from one or more instructions and/or the one or more parameters to the controller module 302 via the third signal pathway 356.

The PMU module 312 is responsible for battery and power system management of the IUT 300. The PMU module 312 may monitor a power signal from the fourth signal pathway 358. For example, the PMU module 312 uses the power signal to monitor current, voltages, and/or temperature readings within the IUT 300. As additional examples, the PMU module 312 may also monitor power connections and battery charges using the power signal; charge batteries when necessary; control one or more power signals being supplied to other integrated circuits; and/or perform other power functions of the IUT 300. The PMU module 312 may provide and/or control power to one or more components included in the IUT 300, such as the RF module 310 and/or the BB module 314 to provide some examples. The PMU module 312 may execute the one or more instructions optionally using the one or more parameters provided by the controller module 302 and provide results from one or more instructions and/or the one or more parameters to the controller module 302 via the fourth signal pathway 358.

The BB module 314 controls operation of the IUT 300. The BB module 314 recovers information, such as voice, data, and/or commands to provide some examples, from a recovered communications sequence via the fifth signal pathway 360. The BB module 314 provides information, such as voice, data, and/or commands to provide some examples, as a transmission sequence to the fifth signal pathway 360. This information may be received as an input from a user of the IUT 300 or may be generated by the BB module 314 in response to performing a command. The BB module 314 additionally provides output to, for example, a user of the IUT 300, and receives input via input/output contact pads, as will be recognized by one skilled in the relevant art(s). The BB module 314 may execute the one or more instructions optionally using the one or more parameters provided by the controller module 302 and provide results from one or more instructions and/or the one or more parameters to the controller module 302 via the fifth signal pathway 360.

The other functional modules 316 represent other functional modules that may be implemented as part of the IUT 300 and/or other functional modules of other electrical, mechanical, and/or electro-mechanical circuits that are communicatively coupled to the IUT 300. These other functional modules may include a secure element (SE), a wireless network (Wi-Fi) transceiver, or any other functional module that will be apparent to those skilled in the relevant art(s) without departing from the spirit and scope of the present disclosure. The other functional modules 316 communicate with other functional modules of the IUT 300 via the sixth signal pathway 362. The other functional modules 316 may execute the one or more instructions optionally using the one or more parameters provided by the controller module 302 and provide results from one or more instructions and/or the one or more parameters to the controller module 302 via the sixth signal pathway 362.

Second Exemplary Integrated Circuit Under Testing (IUT)

Figure 4A:
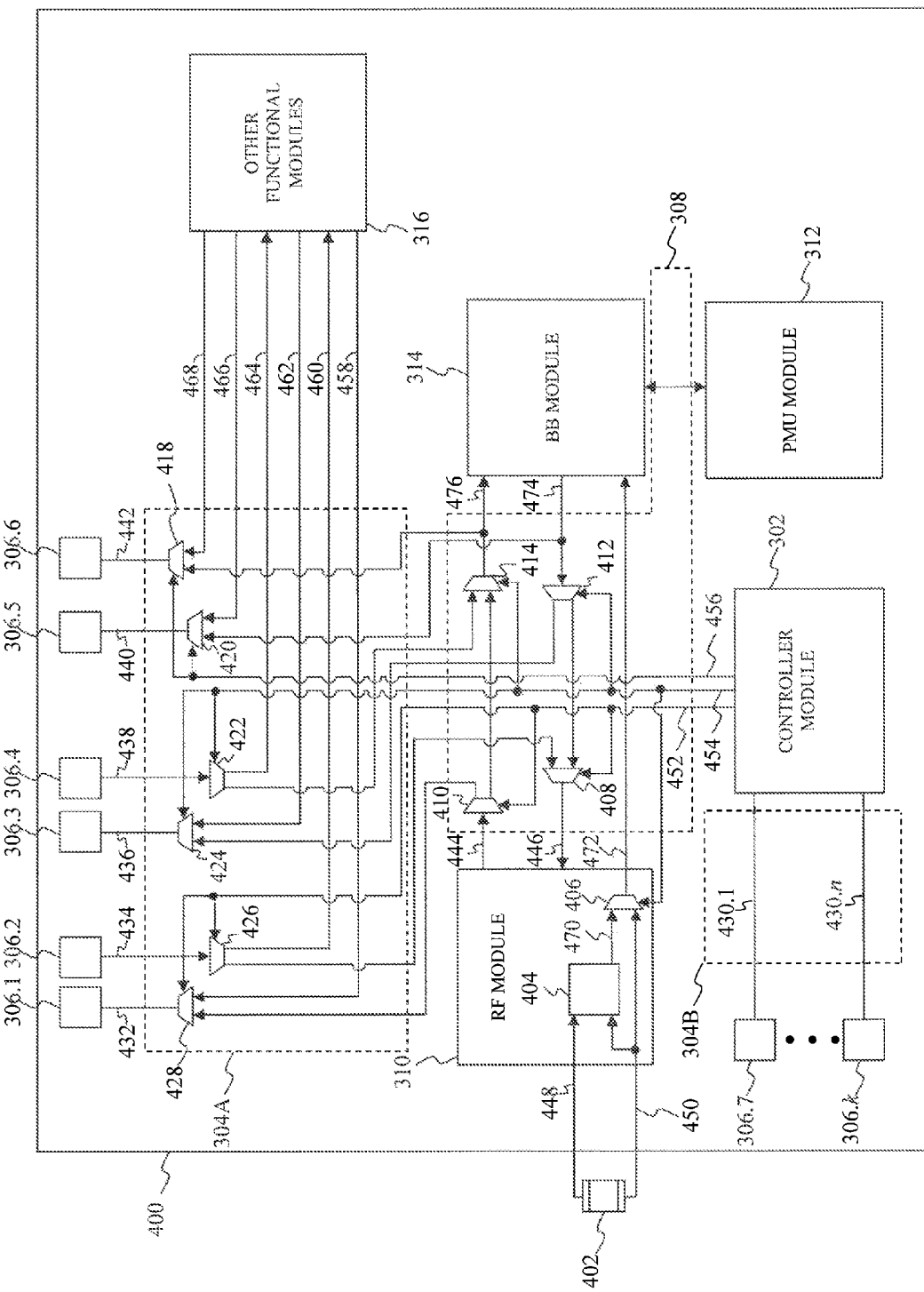
FIG. 4A illustrates a block diagram of a second IUT according to an exemplary embodiment of the present disclosure.

FIG. 4A illustrates a block diagram of a second IUT according to an exemplary embodiment of the present disclosure. An IUT 400 is configurable to operate in various modes of operation to allow testing and/or monitoring of performance of its various functional modules. In various testing modes of operation, the IUT 400 is configurable to isolate or expose at least one functional module from its functional modules and to test the performance of this isolated functional module. In various monitoring modes of operation, the IUT 400 is configurable to monitor various signals and/or its various functional modules. The IUT 400 includes the controller module 302, the pad allocation module 304, denoted as pad allocation module 304A and pad allocation module 304B in FIG. 4A, the configurable contact pads 306.1 through 306.k, the switching interconnect module 308, the RF module 310, the PMU module 312, the BB module 314, and the other functional modules 316. The IUT 400 may represent an exemplary embodiment of the IUT 104 and/or the IUT 300.

As described above, the controller module 302 monitors the configuration of the configurable contact pads 306.1 through 306.k, which transmit a control word 430.1 through 430.n, upon powering up of the IUT 400 to determine if they have been strapped. When the configurable contact pads 306.7 through 306.k have been strapped, the control word 430.1 through 430.n will assume certain values, which indicate that the IUT 400 should enter one of several modes of operation, such as the testing, monitoring, or normal modes of operation. In this exemplary embodiment, the testing modes of operation include a RF-only mode of test operation and BB-only mode of test operation. In the RF-only and the BB-only modes of test operation, the IUT 400 substantially isolates the RF module 310 and the BB module 314, respectively, from other functional modules to test the performance of these isolated functional modules. When the configurable contact pads 306.7 through 306.k are strapped to values that represent any of these modes, the controller module 302 provides a RF-only select signal 452, a BB-only select signal 454, and a monitor mode select signal 456 via various signal pathways, such as the first signal pathway 352 to provide some examples. The select signal asserted depends on the strapped value input to controller module 302.

The controller module 302 receives its power from a core supply, which is the first power available to the combinational circuitry of the IUT 400. Thus, controller module 302 is among the first circuits of the IUT 400 to receive power to function. This is useful since it is desirable for controller module 302 to power up first so it may check whether the configurable contact pads 306.7 through 306.k have been strapped to signal a desired mode of operation. The power input from a core supply is not shown in FIG. 4A. Additionally, not all interconnections to and from controller module 302 are shown for sake of simplicity but will be easily recognizable to one of skill in the relevant art(s).

The pad allocation module 304A includes multiplexers 418, 420, 424, and 428 and demultiplexers 422 and 426. The multiplexers 418, 420, 424, and 428 and the demultiplexers 422 and 426 are configured and arranged to route various signals from the RF module 310, the PMU module 312, the BB module 314, and/or the other functional modules 316 to the configurable contact pads 306.1 through 306.6 via its signal pathway, such as the second signal pathway 354 to provide an example. The pad allocation module 304A sends/receives various input/output signals 432, 434, 436, 438, 440, and 442 to/from the configurable contact pads 306.1 through 306.6.

The pad allocation module 304B is configured and arranged to route the control word 430.1 through 430.n between testing equipment, such as the testing module 102 or the testing module 200 to provide some examples, and the controller module 302 as well as between electrical, mechanical, and/or electro-mechanical circuits and the controller module 302.

The switching interconnect module 308 includes multiplexers 408 and 410 and demultiplexers 412 and 414. The multiplexers 408 and 410 and demultiplexers 412 and 414 are configured and arranged to route various signals between the pad allocation module 304A, the configurable contact pads 306.1 through 306.k, the switching interconnect module 308, the RF module 310, the PMU module 312, the BB module 314, and the other functional modules 316. Although the pad allocation module 304A, the pad allocation module 304B, and the switching interconnect module 308 are described as including various multiplexers and demultiplexers, those skilled in the relevant art(s) will recognize that other switching elements may be used without departing from the spirit and scope of the present disclosure.

The RF module 310 is configured to provide a received sequence of data 444 to the switching interconnect module 308 via its signal pathway, such as the third signal pathway 356 to provide an example, and/or to receive a sequence of transmission data 446 from the switching interconnect module 308 via its signal pathway. Typically, a differential clock source 402, which is external to the IUT 400, provides clock inputs 448 and 450 to the RF module 310. The clock source 402 may be, for example, a digitally compensated crystal oscillator. In one embodiment, the clock source 402 provides a clock having a fundamental frequency of approximately 26 MHz to the RF module 310. The clock inputs 448 and 450 first enter the RF module 310 in the IUT 400. Within the RF module 310, the clock inputs 448 and 450 enter a RE clock logic block 404, which is used when the IUT 400 is in normal mode of operation. The RF clock logic block 404 may be, for example, circuitry used for reducing the clock rate when the IUT 400 is placed in low power mode or the quality of the clock signal necessary may be lower than what the clock source 402 provides.

The RF module 310 also includes a multiplexer 406 for switching between a clock output 470 from a RF clock logic block 404 and the clock input 450 directly from the clock source 402. When in normal mode of operation, the multiplexer 406 provides the clock output 470 as a clock output 472 to the switching interconnect module 308 via the signal pathway, such as the third signal pathway 356 to provide an example. However, when the configurable contact pads 306.7 through 306.k are strapped to indicate that the IUT 400 should enter the BB-only mode of test operation causing the multiplexer 406 to output the clock input 450 as the clock output 472.

This is useful because, when in test mode operation, the chance exists that the configuration of the RF module 310, and the RF clock logic block 404 in particular, includes some latent programming error that would prevent the RF clock logic block 404 from properly outputting the clock output 470. It is desirable to still take advantage of the routing set for the clock signal provided by clock source 402 between the RF module 310 and the BB module 314 even while in BB-only mode of test operation because the routing on the chip has already been optimized.

The PMU module 312 is coupled to the BB module 314. Specifically, the switching interconnect module 308 is configured and arranged to couple a signal pathway of the BB module 314, such as the fifth signal pathway 360 to provide an example, to a signal pathway of the PMU module 312, such as the fourth signal pathway 358 to provide an example.

The BB module 314 is configured to provide a sequence of data 474 to the switching interconnect module 308 via its signal pathway, such as the fifth signal pathway 360 to provide an example, and/or to receive a recovered sequence of data 476 from the switching interconnect module 308 via its signal pathway.

The other functional modules 316 send/receive various input/output signals 458, 460, 462, 464, 466, and 468 to/from its signal pathway, such as the sixth signal pathway 362 to provide an example.

As discussed above, the IUT 400 is configurable to operate in the normal mode of operation, the RF-only mode of test operation, the BB-only mode of test operation, and the monitoring mode of operation. The configuration and arrangement of the pad allocation module 304A, the pad allocation module 304B, and the switching interconnect module 308 are to be discussed for each of these modes of operation. The normal mode of operation is to be described in conjunction with FIG. 4B, The RF-Only Mode of Test Operation is to be described in conjunction with FIG. 4C, the BB-Only Mode of Test Operation is to be described in conjunction with FIG. 4D, and the monitoring mode of operation is to be described in conjunction with FIG. 4E.

Figure 4B:
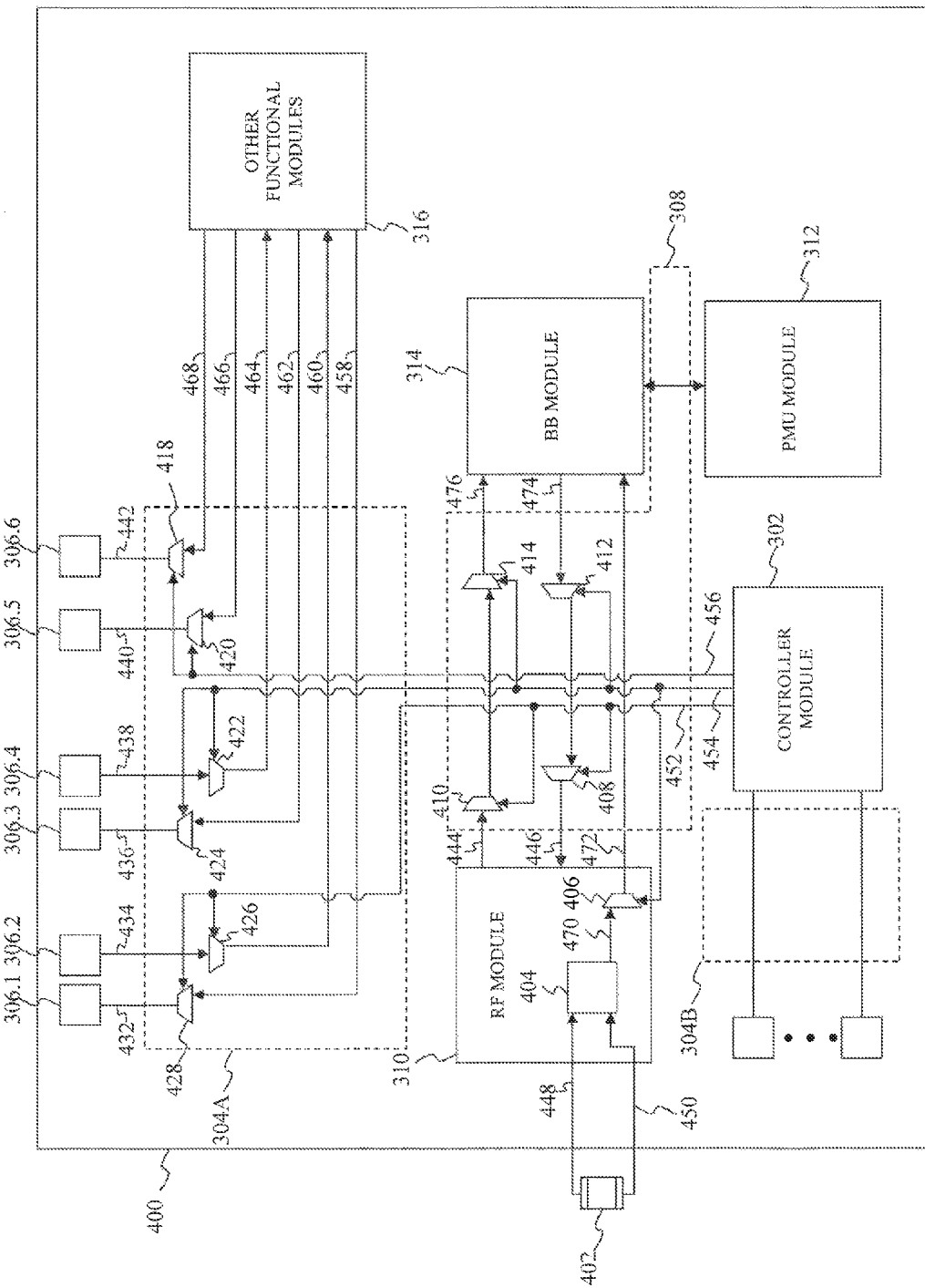
FIG. 4B illustrates a block diagram of a normal mode of operation of the second IUT according to an exemplary embodiment of the present disclosure.

As shown in FIG. 4B, in the normal mode of operation, the RF-only select signal 452, the BB-only select signal 454, and the monitor mode select signal 456 are configured to cause the switching interconnect module 308 to couple the received sequence of data 444 to the recovered sequence of data 476 and to couple the sequence of data 474 to the sequence of transmission data 446. Also, the RF-only select signal 452, the BB-only select signal 454, and the monitor mode select signal 456 are configured to cause the pad allocation module 304A to couple the various input/output signals 458, 460, 462, 464, 466, and 468 to corresponding various input/output signals 432, 434, 436, 438, 440, and 442 in the normal mode of operation.

Figure 4C:
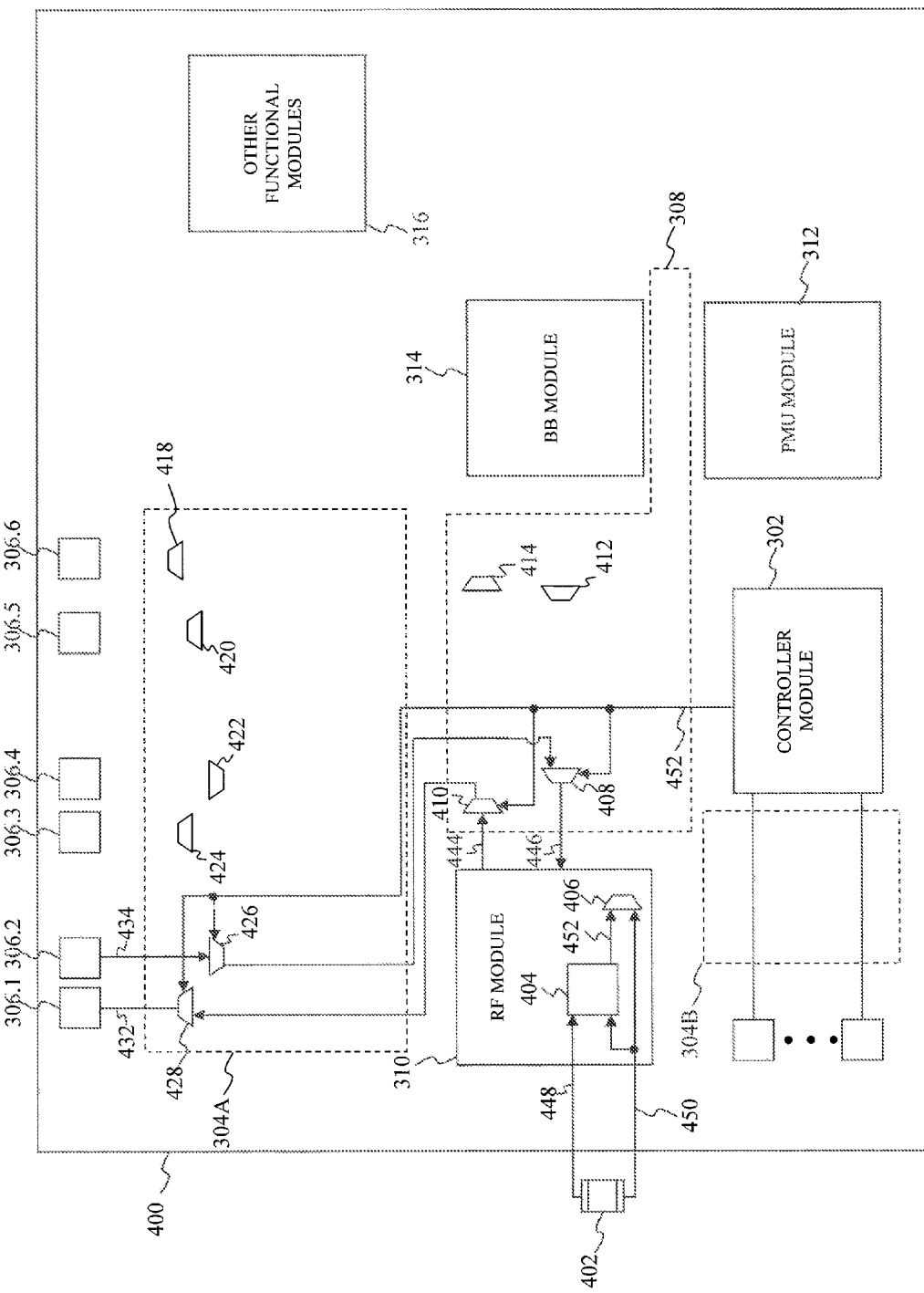
FIG. 4C illustrates a block diagram of a RF-Only Mode of Test Operation of the second IUT according to an exemplary embodiment of the present disclosure.

As shown in FIG. 4C, in the RF-only mode of test operation, the RF-only select signal 452 is configured to cause the pad allocation module 304A and the switching interconnect module 308 to couple the received sequence of data 444 to the input/output signal 432 and to couple the input/output signal 434 to the sequence of transmission data 446. This configuration and arrangement of the pad allocation module 304A and the switching interconnect module 308 effectively isolates the RF module 310 from other modules of the IUT 400. It should be noted that various couplings between the configurable contact pads 306.1 through 306.k, the switching interconnect module 308, the PMU module 312, the BB module 314, and the other functional modules 316 may be possible in the RF-only mode of test operation; however, these coupling are not illustrated in FIG. 4C.

Figure 4D:
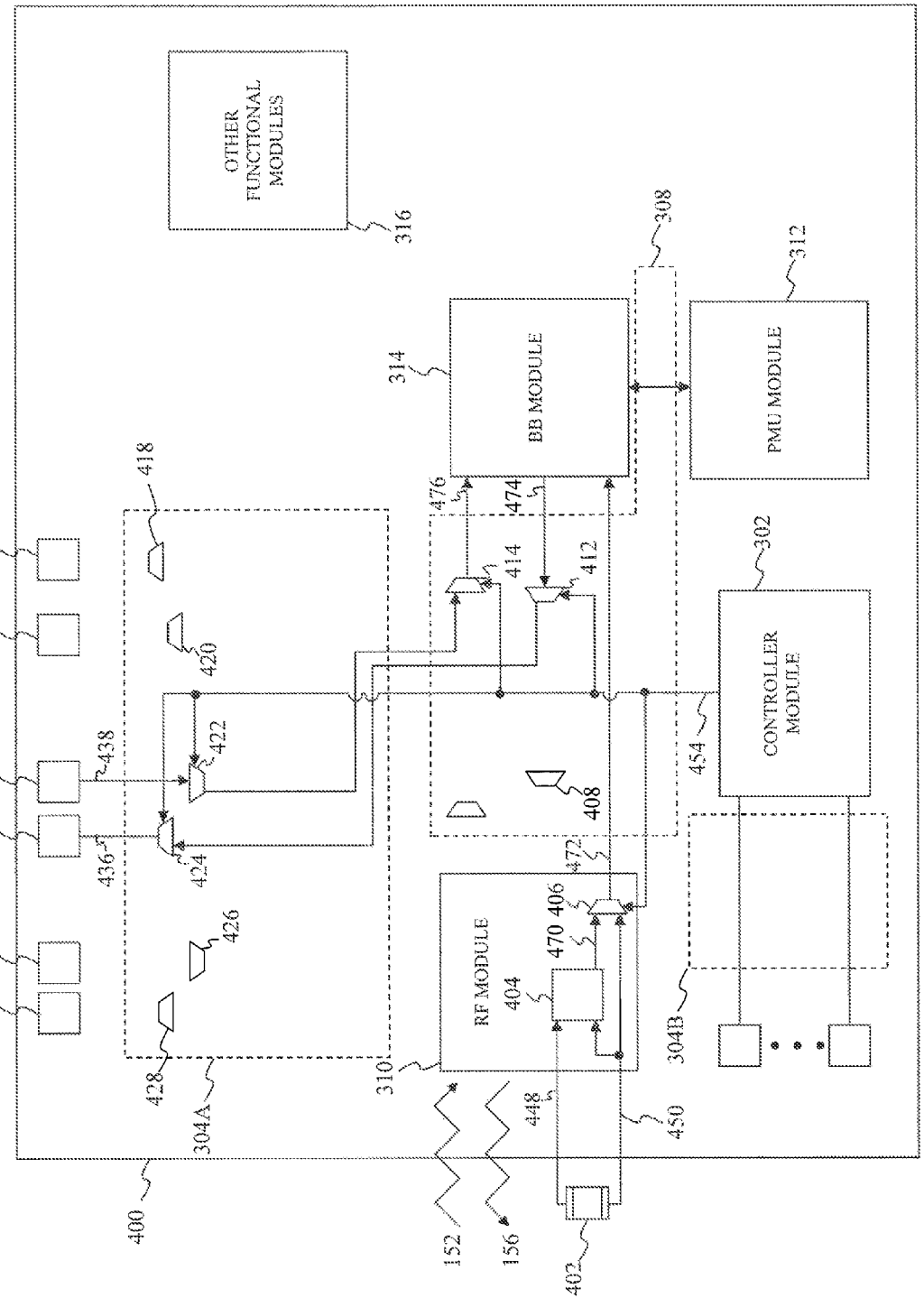
FIG. 4D illustrates a block diagram of a BB-Only Mode of Test Operation of the second IUT according to an exemplary embodiment of the present disclosure.

As shown in FIG. 4D, in the BB-only mode of test operation, the BB-only select signal 454 is configured to cause the pad allocation module 304A and the switching interconnect module 308 to couple the sequence of data 474 to the input/output signal 436, to couple the input/output signal 438 to the recovered sequence of data 476, and to provide the clock output 472 to the BB module 314. This configuration and arrangement of the pad allocation module 304A and the switching interconnect module 308 effectively isolates the BB module 314 from other modules of the IUT 400. It should be noted that various couplings between the configurable contact pads 306.1 through 306.k, the switching interconnect module 308, the RF module 310, the PMU module 312, and the other functional modules 316 may be possible in the RF-only mode of test operation; however, these coupling are not illustrated in FIG. 4D.

Figure 4E:
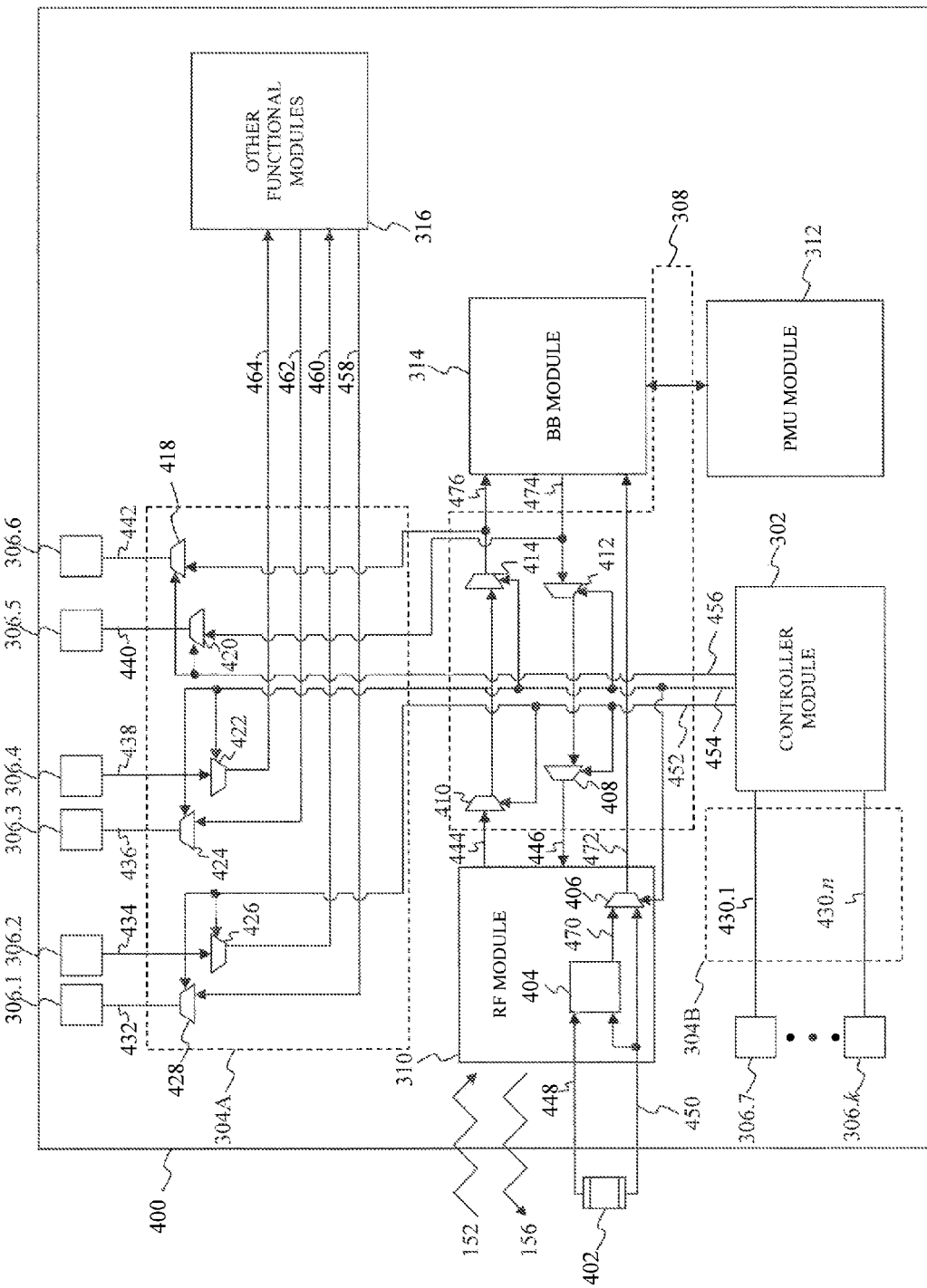
FIG. 4E illustrates a block diagram of a monitoring mode of operation of the second IUT according to an exemplary embodiment of the present disclosure.

As shown in FIG. 4E, in the monitoring mode of operation, the RF-only select signal 452, the BB-only select signal 454, and the monitor mode select signal 456 are configured to cause the switching interconnect module 308 to couple the received sequence of data 444 to the recovered sequence of data 476 and to couple the sequence of data 474 to the sequence of transmission data 446. Also, the RF-only select signal 452, the BB-only select signal 454, and the monitor mode select signal 456 are configured to cause the pad allocation module 304A to couple the input/output signals 458, 460, 462, and 464 to corresponding input/output signals 432, 434, 436, and 438, and to couple the input/output signals 440 and 442 to the sequence of data 474 and the recovered sequence of data 476, respectively, for monitoring these signals.

For any of the modes discussed above, and any additional modes possible as desired, the signals discussed above may be of any size, but will typically be a bus of multiple bits as will be recognized by one of skill in the relevant art(s). In addition, while the discussion above assumes that the select signals enable the different modes of operation when asserted high, the same can be achieved by alternatively asserting the select signals low to cause the mode changes above to occur.

The present description of the various modes of operation described herein should not be construed to be limited to only the number of input or output signals in the above discussion and shown in the attached figure(s). As will be apparent to one of skill in the relevant art(s), the number of signals and associated contact pads reused for these modes of operation may be scaled up or down based upon the number necessary to monitor all internal signals of interest as well as inputs/provides necessary for testing each functional module—including the associated change in multiplexers necessary for each additional signal.

Figure 5:
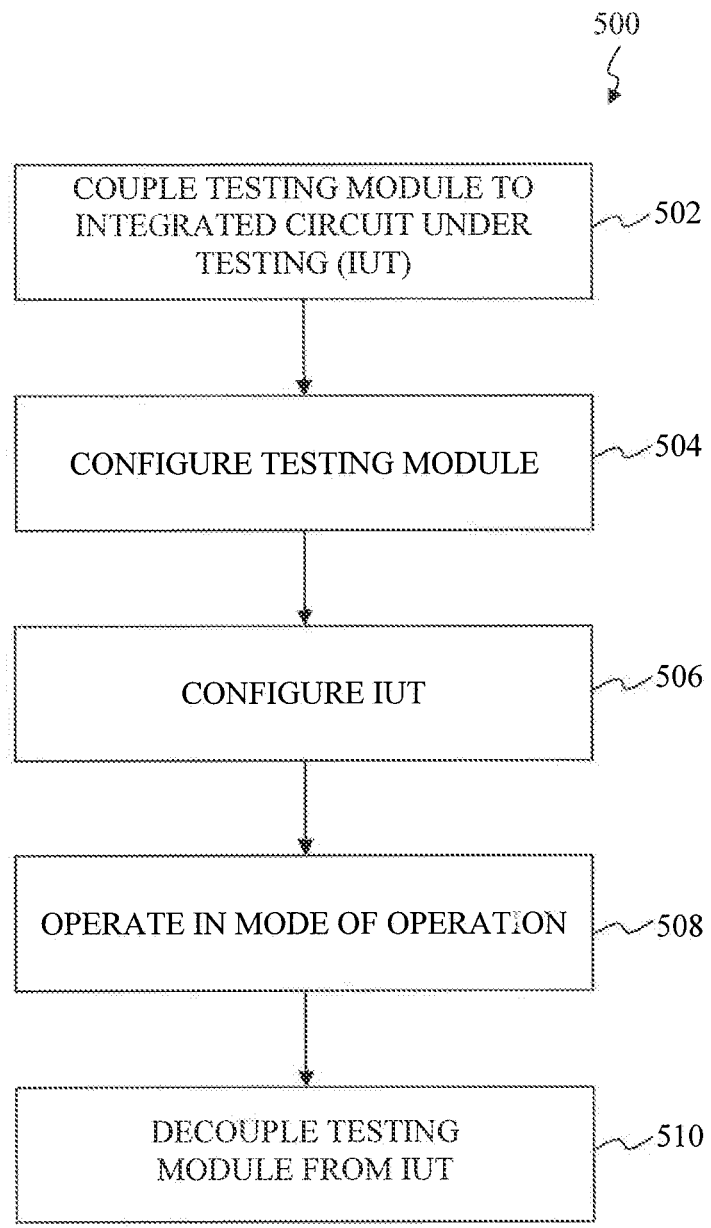
FIG. 5 is a flowchart of exemplary operational steps for communicating between modules of the exemplary testing environment according to an exemplary embodiment of the present disclosure.

An Exemplary Embodiment of Operational Control Flow for Communicating Between Modules of the Exemplary Testing Environment FIG. 5 is a flowchart of exemplary operational steps for communicating between modules of the exemplary testing environment according to an exemplary embodiment of the present disclosure. The disclosure is not limited to this operational description. Rather, it will be apparent to persons skilled in the relevant art(s) from the teachings herein that other operational control flows are within the scope and spirit of the present disclosure. The following discussion describes the steps in FIG. 5.

At step 502, the operational control flow couples a testing module, such as the testing module 102 or the testing equipment 200 to provide some examples, to an integrated circuit under test (IUT), such as the IUT 104, the IUT 300 or the IUT 400 to provide some examples. The operational control flow may couple the testing module to the IUT using a wired connection over a communications cable such as a coaxial cable, a copper conductor, a fiber optic cable or any other suitable wired connection that will be apparent to those skilled in the relevant art(s) and/or a wireless connection over a communications channel.

At step 504, the operational control flow configures the testing equipment to enter into a mode of operation, such as the testing mode of operation and/or the monitoring mode of operation. The operational control flow configures couplings, such as input connections and/or output connections to provide some examples, of the testing equipment for testing and/or monitoring of the IUT. For example, the operational control flow may provide a first set of one or more instructions and/or parameters to configure the couplings of the testing equipment in the testing mode of operation and/or a second set of one or more instructions and/or parameters to configure the couplings of the testing equipment in the monitoring mode of operation. The first and second sets of one or more instructions and/or parameters configure the couplings of the testing equipment to be in a first configuration to operate in the testing mode of operation or a second configuration to operate in the monitoring mode of operation.

At step 506, the operational control flow configures the IUT to enter into the mode of operation. Typically, the testing equipment provides a communication signal to the IUT via the wired connection and/or the wireless connection. This communication signal may include one or more instructions and/or parameters to be used by the IUT. The one or more instructions and/or parameters may include configuration information to configure the IUT to operate in the mode of operation. Alternatively, the one or more instructions and/or parameters may indicate the mode of operation to cause execution of other instructions and/or parameters that are stored within the IUT to configure the IUT to operate in the mode of operation.

At step 508, the testing equipment and the IUT operate in accordance with the mode of operation. For example, in the testing mode of operation, the IUT executes a testing routine that may include the one or more instructions and/or parameters from step 506, to test, its various functional modules and/or functional modules of other electrical, mechanical, and/or electro-mechanical circuits that are communicatively coupled to the IUT to determine whether they operate as expected. As another example, in the monitoring mode of operation, the IUT provides one or more signals to the testing equipment for monitoring. Typically, the one or more signals represent internal signals between various functional modules of the IUT; however, those skilled in the relevant art(s) will recognize that the one or more signals may include any signal within the IUT and/or other signals from other electrical, mechanical, and/or electro-mechanical circuits without departing from the spirit and scope of the present disclosure.

At step 510, the operational control flow decouples the testing module from the IUT. Alternatively, the operational control flow may revert to step 504 to configure the testing module and the IUT for another mode of operation.

Third Exemplary Integrated Circuit Under Testing (IUT)

Figure 6:
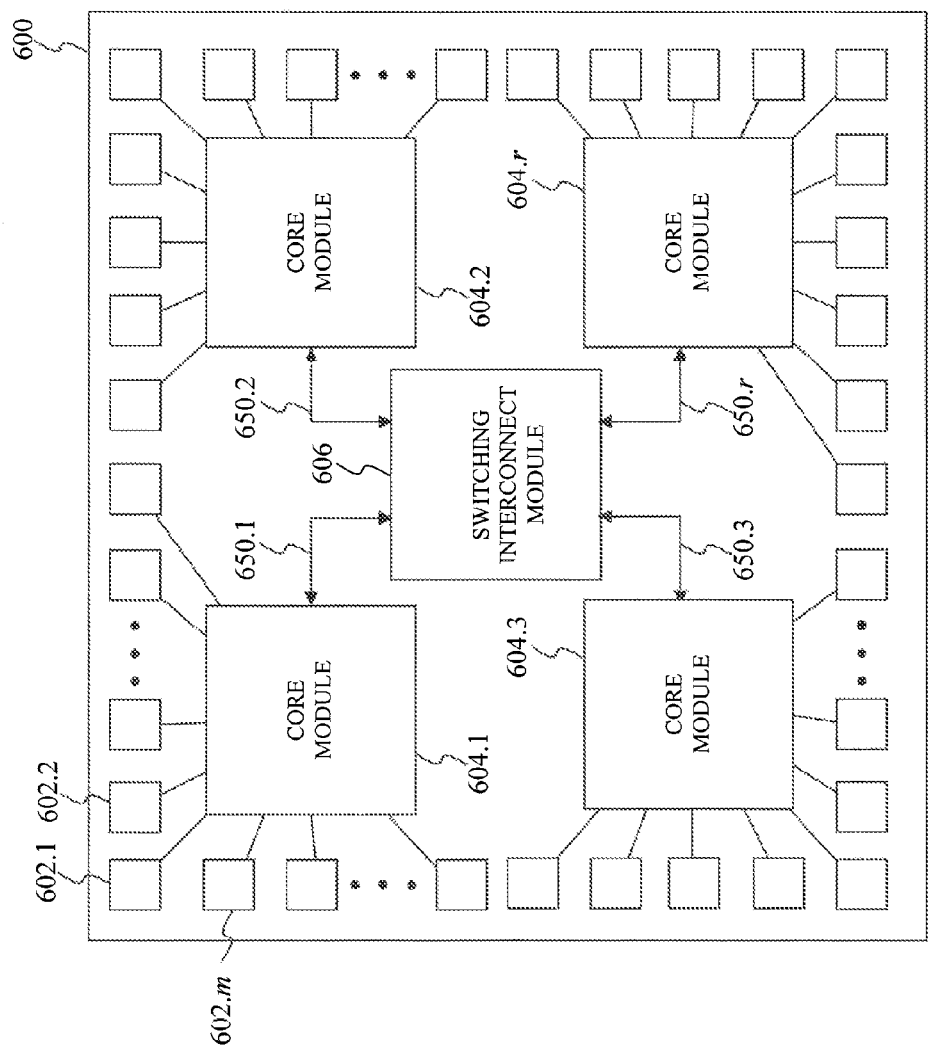
FIG. 6 illustrates a block diagram of a third IUT according to an exemplary embodiment of the present disclosure.

FIG. 6 illustrates a block diagram of a third IUT according to an exemplary embodiment of the present disclosure. An IUT 600 executes one or more instructions optionally using one or more parameters from testing equipment, such as the testing module 102 or the testing equipment 200 to provide some examples, in a testing mode of operation. Alternatively, the IUT 600 provides one or more signals to the testing equipment in a monitoring mode of operation. The IUT 600 includes configurable contact pads 602.1 through 602.$m$, core modules 604.1 through 604.$r$, and a switching interconnect module 606.

The configurable contact pads 602.1 through 602.$m$ represent couplings between the IUT 600 and other electrical, mechanical, and/or electro-mechanical circuits, such as the testing equipment and/or other integrated circuits to provide some examples. The one or more configurable contact pads 602.1 through 602.$m$ may be coupled to one or more pins, one or more solder balls, one or more leads, and/or to any other suitable coupling that may be used to electrically couple the IUT 600 to other electrical, mechanical, and/or electro-mechanical circuits that will be apparent to those skilled in the relevant art(s) without departing from the spirit and scope of the present disclosure. The arrangement of the configurable contact pads 602.1 through 602.$m$ as shown in FIG. 6 is for illustrative purposes only; those skilled in the relevant art(s) will recognize that other arrangements may be possible without departing from the spirit and scope of the present disclosure.

Tne core modules 604.1 through 604.$r$ represent various modules of the IUT 600 that are configurable to enter into the testing mode of operation and/or the monitoring mode of operation. The configuration and arrangement of the core modules 604.1 through 604.$r$ as shown in FIG. 6 is for illustrative purposes only; those skilled in the relevant art(s) will recognize that other configurations and arrangements may be possible without departing from the spirit and scope of the present disclosure. Additionally, those skilled in the relevant art(s) will recognize that the IUT 600 may include more or less core modules than that shown in FIG. 6 without departing from the spirit and scope of the present disclosure.

Typically, each of the core modules 604.1 through 604.$r$ is implemented in a substantially similar manner as the IUT 300 or the IUT 400 to provide some examples. In an exemplary embodiment, one of the core modules 604.1 through 604.$r$ represents a master core module that is configured to control overall configuration and operation of other core modules 604.1 through 604.$r$. In this exemplary embodiment, these other core modules 604.1 through 604.$r$ may be referred to as slave core modules. The master core module provides one or more instructions and/or parameters to the slave core modules. The one or more instructions and/or one or more parameters may include configuration information for the slave core modules, one or more instructions of a testing routine, parameters, such as pattern data to provide an example, to be used by the testing routine, configuration information for the slave core modules and/or the configurable contact pads 602.1 through 602.$m$, and/or any other suitable instruction and/or parameter that may be used by the slave modules in the testing mode of operation and/or the monitoring mode of operation that will be apparent to those skilled in the relevant art(s) from the teachings herein without departing from the spirit and scope of the present disclosure.

The switching interconnect module 606 configures and arranges one or more couplings between the core modules 604.1 through 604.$r$. Typically, the switching interconnect module 606 may couple core modules 604.1 through 604.$r$ to other core modules 604.1 through 604.$r$ by configuring various signal pathways, such as a first signal pathway 650.1, a second signal pathway 650.2, a third signal pathway 650.3, and an $r^{th}$ signal pathway 650.$r$. These signal pathways provide bidirectional communication between the switching interconnect module 606 and their corresponding core module 604.1 through 604.$r$. For example, the switching interconnect module 606 may configure the first signal pathway 650.1 to be coupled to one or more of the second signal pathway 650.2, the third signal pathway 650.3, and/or the $r^{th}$ signal pathway 650.$r$. However, this example is not limiting, those skilled in the relevant art(s) will recognize that the switching interconnect module 606 may configure corresponding signal pathways of any core module of the IUT 600 to be coupled to other corresponding signal pathways of other core modules of the IUT 600 without departing from the spirit and scope of the present disclosure. The switching interconnect module 606 may couple each signal pathway to more than one core module of the IUT 600 when appropriate.

Although the Detailed Description has been in terms of a single IUT, such as an SoC or a PCB, the disclosure is equally applicable to reconfigurable interconnections and/or pad configurations in testing or normal operation, such as across multiple SoCs via adaptive PCB interconnect structures, across multiple SoC's in different devices via a communications pathway between the devices, within a PCB test environment, during assembled unit testing, or during module operation and interconnect reconfigurations.

Figure 7:
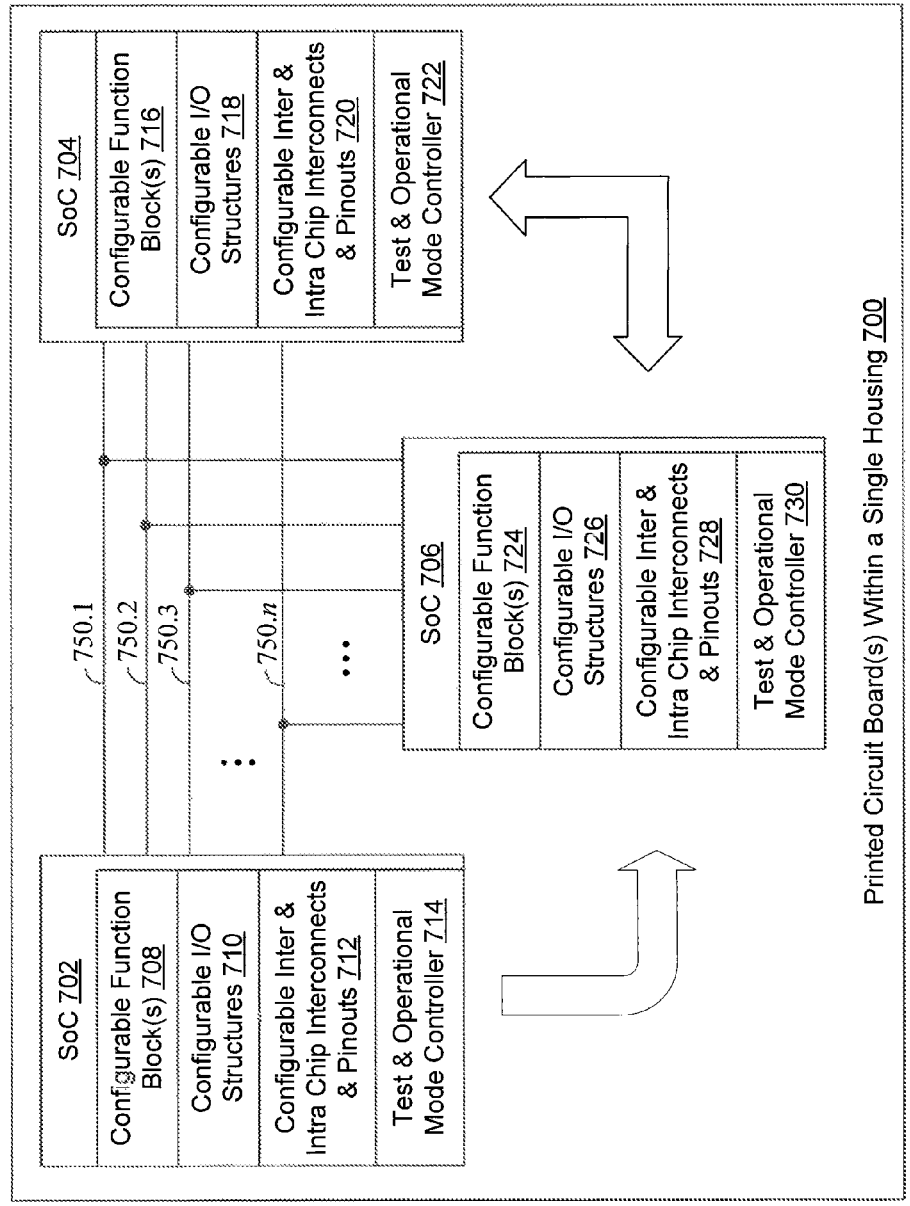
FIG. 7 illustrates a block diagram of a system environment according to an exemplary embodiment of the present disclosure.

For example, FIG. 7 illustrates a block diagram of a system environment according to an exemplary embodiment of the present disclosure. In FIG. 7, multiple SoCs 702 through 706 are located within PCB(s) within a single housing 700. However, those skilled in the relevant art(s) will recognize that the single housing 700 may include a different number of SoCs without departing from the spirit and scope of the present disclosure. SoCs 702 through 706 share signal pathways 750.1 through 750.$n$. SoC 702 includes configurable functional block(s) 708, configurable I/O structures 710, configurable inter- and intra-chip interconnections and pinouts 712, and test and operational mode controller 714. SoC 704 includes configurable functional block(s) 716, configurable I/O structures 718, configurable inter- and intra-chip interconnections and pinouts 720, and test and operational mode controller 722. SoC 706 includes configurable functional block(s) 724, configurable I/O structures 726, configurable inter- and intra-chip interconnections and pinouts 728, and test and operational mode controller 730. As the structure of each SoC in FIG. 7 is substantially similar, discussion of the individual blocks depicted as within the SoCs will focus on SoC 702 for brevity.

Configurable I/O structures 710 includes input and output functionality and circuitry (e.g., ESD, tri-state, pull up/down, etc.) as well as a full disconnect option. For example, if SoC 702 and SoC 706, in a first mode of operation, use a first bus (a subset of signal pathways 750.1 through 750.n), then SoC 704, which also has connections to the first bus, may need to ignore all first mode traffic on the first bus. To do this, test and operational mode controller 722 will cause configurable inter- and intra-chip interconnections and pinouts 720 to disconnect all of configurable functional block(s) 716 from such bus pinouts, while also disconnecting all configurable I/O structures 718 from such bus pinouts. When placed in a second mode of operation, still using the first bus, SoC 706 might communicate with SoC 704. To do this, test and operational mode controller 714 places configurable inter- and intra-chip interconnections and pinouts 712 and configurable I/O structures 710 in disconnect states while SoCs 706 and 704 (via test and operational mode controllers 730 and 722) appropriately configure configurable I/O structures 726/configurable inter- and intra-chip interconnections and pinouts 728 and configurable I/O structures 718/configurable inter- and intra-chip interconnections and pinouts 720 to utilize the first bus. Further, test and operational mode controller 730, while in the first mode of operation, places configurable functional block(s) 724 in a first functional configuration. While in the second mode, test and operational mode controller 730 places configurable functional block(s) 724 in a second functional configuration.

In an exemplary embodiment, SoCs 702 through 706 may step through multiple reconfigurations in a time division duplex (TDD) manner, driven by a test or system program. One of the SoCs 702 through 706 represents a master SoC that is configured to control overall configuration and operation of other SoCs 702 through 706. In this exemplary embodiment, these other SoCs 702 through 706 may be referred to as slave SoCs. The master SoC provides one or more instructions and/or parameters to the slave SoCs. The one or more instructions and/or one or more parameters may include configuration information for the slave SoCs, one or more instructions of a testing routine, parameters, such as pattern data to provide an example, to be used by the testing routine, configuration information for the slave SoCs, and/or any other suitable instruction and/or parameter that may be used by the slave SoCs in the testing mode of operation and/or the normal mode of operation that will be apparent to those skilled in the relevant art(s) from the teachings herein without departing from the spirit and scope of the present disclosure.

The signal pathways 750.1 through 750.n may be reconfigured, for example, to enable the SoCs to test each other in a testing environment and/or to enable reuse of the signal pathways 750.1 through 750.n for normal operation, such that fewer total signal pathways are required to achieve the same level of performance.

The configuration and arrangement of the SoCs 702 through 706 as shown in FIG. 7 is for illustrative purposes only; those skilled in the relevant art(s) will recognize that other configurations and arrangements may be possible without departing from the spirit and scope of the present disclosure. Additionally, those skilled in the relevant art(s) will recognize that the PCB 700 may include more or fewer SoCs than that shown in FIG. 7 without departing from the spirit and scope of the present disclosure.

Figure 8:
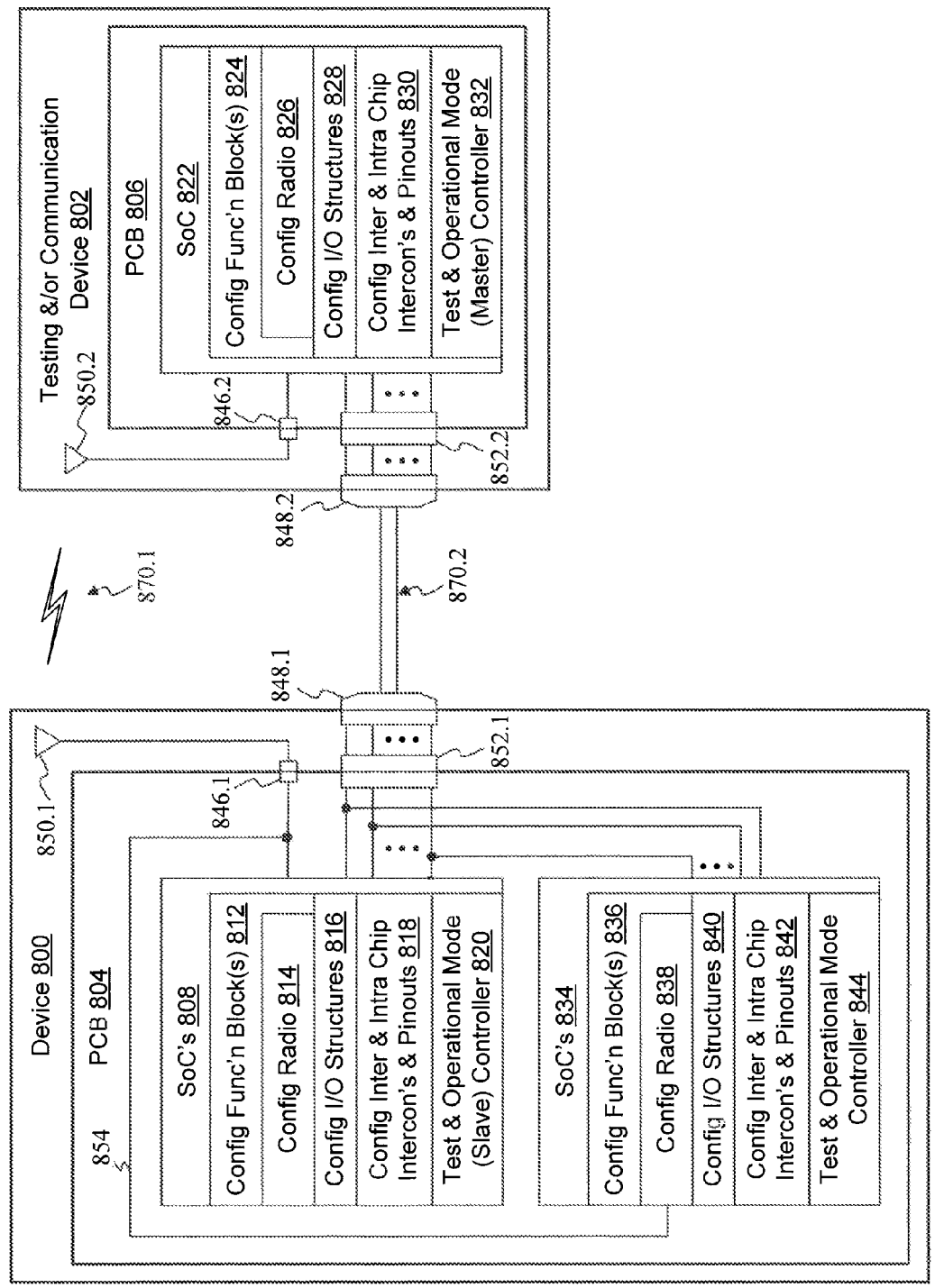
FIG. 8 illustrates a block diagram of another system environment according to an exemplary embodiment of the present disclosure.

As an additional example, FIG. 8 illustrates a block diagram of another system environment according to an exemplary embodiment of the present disclosure. FIG. 8 illustrates multiple SoCs 808 and 834 within device 800 on PCB 804, and SoC 822 within testing and/or communication device 802 on PCB 806. Devices 800 and 802 may constitute a coordination environment between devices 800 and 802 via wireless link 870.1 and wired link 870.2. SoC 808 includes configurable functional block(s) 812, configurable radio 814, configurable I/O structures 816, configurable inter- and intra-chip interconnections and pinouts 818, and test and operational mode controller 820 SoC 822 includes configurable functional block(s) 824, configurable radio 826, configurable I/O structures 828, configurable inter- and intra-chip interconnections and pinouts 830, and test and operational mode controller 832 SoC 834 includes configurable functional block(s) 836, configurable radio 838, configurable I/O structures 840, configurable inter- and intra-chip interconnections and pinouts 842, and test and operational mode controller 844.

In FIG. 8, radios 814 and 838 can compete for the single antenna 850.1 to support specific operational and test modes via interaction with device 802. To carry this transition out, test and operational mode (slave) controller 820 disconnects radio 814 from the antenna 850.1 by controlling the configuration of configurable I/O structures 816 and configurable inter- and intra-chip interconnections and pinouts 818. Meanwhile, test and operational mode controller 844 connects configurable I/O structures 840 to the antenna 850.1 by controlling the configuration of configurable I/O structures 840 and configurable inter- and intra-chip interconnections and pinouts 842. This transition may involve testing, such as where test signals flow across the wireless link 870.1 via the radios 850.1 and 850.2.

Alternatively, the antenna output can be used without the radios 850.1 and 850.2 via a normal signal pathway 870.2 (e.g., a wired connection or cable), illustrated as the lines input to the PCB connectors 852.1 and 852.2. In this situation, test and operational mode controllers 820, 832 and 844 each disconnect their radios so that another functional block within configurable functional block(s) 812 can be exposed to a different functional block within configurable functional block(s) 836 via the normal signal pathway 870.2 and the lines input to the PCB connectors 852.1 and 852.2 (i.e., antenna PCB conductor traces). This may be done for testing purposes or to support a particular operational mode.

Testing and operational mode controller 844 may also place one of the functional blocks within configurable functional block(s) 812 in a particular mode of operation, while coupling (by appropriately configuring configurable inter- and intra-chip interconnections and pinouts 818 and configurable I/O structures 816) such functional block's specific input/output to the normal signal pathway 870.2 for interaction the SoC 822 which has been properly configured by testing and operational mode (master) controller 832. Such transition from the first mode to the second may involve a transition from a first test mode to a second test mode, or otherwise involve a transition from a first operational mode to a second operational mode or to a test mode, for example.

Also, either or both of the wireless and wired (cable) pathways 870.1 and 870.2 may be used while still supporting full adaptability of input/output structures, interconnects, control operations, etc., for testing and/or normal mode operations. Embedded test code can be added to support the internal controllers of each SoC, as each SoC may be used to inject test signals and evaluate the results of any functional block within any SoC within any device, even when such control circuitry operates entirely outside of such device, PCB, and SoC of the functional block under test.

Figure 9:
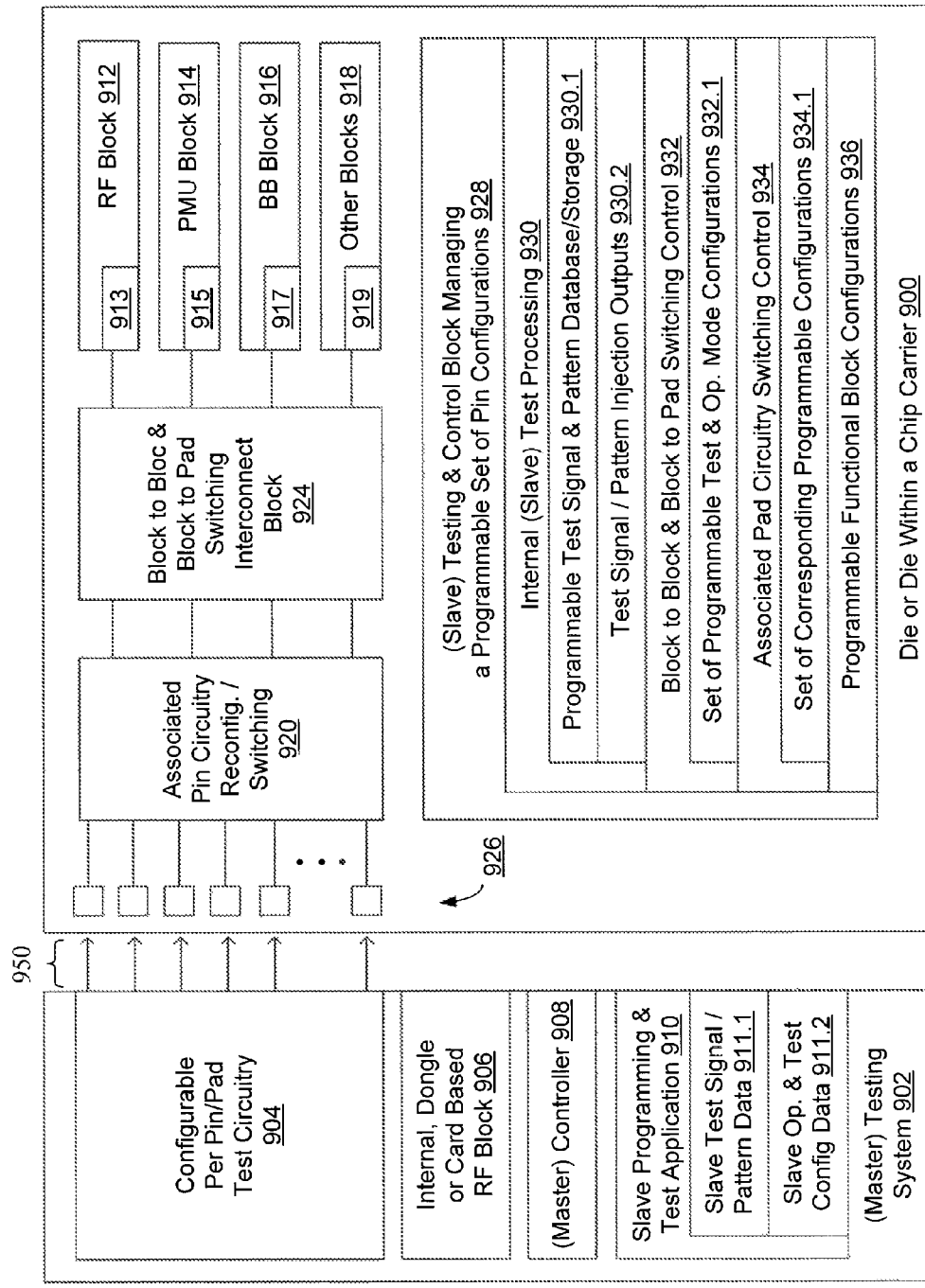
FIG. 9 illustrates a block diagram of a further system environment according to an exemplary embodiment of the present disclosure.

As another example, FIG. 9 illustrates a block diagram of another system environment according to an exemplary embodiment of the present disclosure. In FIG. 9, a die or die within a chip carrier 900 in signal communication with a (master) testing system 902. Testing system 902 includes configurable test circuitry 904, internal, dongle, or card-based RF block 906, (master) controller 908, and slave programming and test application 910. Slave programming and test application 910

Internal, dongle, or card-based RF block 906 is used to inject testing signals, patterns, commands, and controls into die 900. RF block 906 may be used like circuit test systems are currently used in the art, where higher level language in the block that indicates the type of signaling, switching, frequency, and patterns used to inject test signals. However, unlike conventional test systems, RF block 906 may inject test signals via RF block 912 instead of configurable pads 926. Many RF blocks presently fabricated or manufactured include their own antenna/inductor structure (i.e. a small single loop, e.g. a bond wire). In such situations where an RF block, such as RF block 912, has its own antenna/inductor structure, testing system 902 may take advantage of this feature and transmit directly via RF block 906 to RF block 912, thus saving pads from among configurable pads 926 that would otherwise be required to inject signals into the signal path to RF block 912. Where a die or chip has multiple RF blocks, testing system 902 may have multiple RF blocks 906 (cards) attached to take advantage of the multiple RF pathways available. If RF block 912 does not have its own antenna/inductor structure, but instead relies on a pad from among configurable pads 926, testing signals would be unable to be injected into the die 900 using the wireless approach.

Testing and control block 928, as well as programmable functional block configurations 936, are used to configure reconfigurable portions 913, 915, 917, and 919 of the associated blocks 912, 914, 916, and 918. Configuration of the testing and pin circuitry, interconnect, (such as associated pin circuitry 920 and block to block and block to pad switching interconnect block 924) and block configuration by (slave) testing and control block 928 can occur during probe test & package testing, as well as anytime thereafter such as at PCB test, factory service testing, remote and wireless testing, and ongoing periodic testing initiated by (slave) testing and control block 928. In addition, much of the functionality of (slave) testing and control block 928 may be used during normal operational modes, where reconfigurations occur not only in the present SoC, but also on the PCB and neighboring SoCs such that overall PCB trace count, SoC to SoC pad count, etc., can be further reduced. In addition, test signals and pattern data can be used not only to test the present die, but can be used to generate test signals to test neighboring die.

CONCLUSION

It is to be appreciated that the Detailed Description section, and not the Abstract section, is intended to be used to interpret the claims. The Abstract section may set forth one or more, but not all exemplary embodiments, of the present disclosure, and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus the present disclosure should not be limited by any of the above-described exemplary embodiments, but should be defined only in accordance with the following claims and their equivalents.

What is claimed is:

1. An integrated circuit, comprising:
a switching interconnect module;
a controller module, coupled to the switching interconnect module, configured to cause the switching interconnect module to enter into a testing mode of operation or a monitoring mode of operation; and
a plurality of functional modules, coupled to the switching interconnect module, each of the plurality of functional modules being configured to communicate with the switching interconnect module over a corresponding signal pathway from among a plurality of signal pathways,
wherein the switching interconnect module is configurable to couple a signal pathway from among the plurality of signal pathways to another signal pathway from among the plurality of signal pathways.

2. The integrated circuit of claim 1, further comprising:
a plurality of configurable contact pads; and
a pad allocation module configured to set an operation of the plurality of configurable contact pads and to arrange a plurality of connections between the configurable contact pads and the switching interconnect module,
wherein the switching interconnect module is further configurable to couple the plurality of connections to a functional module from among the plurality of functional modules via its corresponding signal pathway.

3. The integrated circuit of claim 1,
wherein the switching interconnect module is further configurable to cause a first configuration of the plurality of signal pathways to isolate at least one functional module from among the plurality of functional modules in the testing mode of operation and to cause a second configuration of the plurality of signal pathways to allow for monitoring of signals within one of the plurality of signal pathways in the monitoring mode of operation.

4. The integrated circuit of claim 1, wherein the controller module is further configured to execute a testing routine in the testing mode of operation, the testing routine being used to determine whether at least one functional module from among the plurality of functional modules operates as expected.

5. The integrated circuit of claim 4, wherein the testing routine includes an instruction to be executed by the plurality of functional modules and a parameter that is to be used by the instruction.

6. The integrated circuit of claim 5, wherein the parameter includes pattern data.

7. The integrated circuit of claim 1, further comprising:
a second integrated circuit configured to operate in a slave mode of operation, wherein the controller module is further configured to operate in a master mode of operation to control configuration and operation of the second integrated circuit.

8. The integrated circuit of claim 1, wherein the plurality of functional modules are selected from a group consisting of:
a radio frequency (RF) module;
a power management unit (PMU) module; and
a baseband (BB) module.

9. An integrated circuit, comprising:
a plurality of modules, the plurality of modules including a radio frequency (RF) module and a baseband (BB) module;
a controller module configured to cause the integrated circuit to enter into one of a plurality of modes of operation; and
a switching interconnect module, responsive to the controller module, configured to:
isolate the RF module from a first subset of modules from among the plurality of modules in a first mode of operation,
isolate the BB module from a second subset of modules from among the plurality of modules in a second mode of operation, and
couple the RF module to the BB module in a third mode of operation.

10. The integrated circuit of claim 9, wherein the switching interconnect module comprises:
a plurality of switchable paths,
wherein a first path and a second path from among the plurality of switchable paths are configurable to be conducting during the first mode of operation,
wherein a third path and a fourth path from among the plurality of switchable paths are configurable to be conducting during the second mode of operation, and
wherein a fifth path and a sixth path from among the plurality of switchable paths are configurable to be conducting during the third mode of operation.

11. The integrated circuit of claim 10, wherein the first path is configured to couple an output of the RF module to a first testing signal,
wherein the second path is configured to couple a second testing signal to an input of the RF module,
wherein the third path is configured to couple the first testing signal to an input of the BB module,
wherein the fourth path is configured to couple an output of the BB module to the second testing signal,
wherein the fifth path is configured to couple the output of the RF module to the input of the BB module, and
wherein the sixth path is configured to couple the output of the BB module to the input of the RF module.

12. The integrated circuit of claim 11, wherein the fifth path is further configured to couple the output of the RF module to the first testing signal, and
wherein the sixth path is further configured to couple the output of the BB module to the second testing signal.

13. The integrated circuit of claim 9, further comprising:
a plurality of configurable contact pads being assigned to one of the plurality of functional blocks,
wherein a first set of configurable contact pads from among the plurality of configurable contact pads is reassigned to the RF functional block in the first mode of operation, and
wherein a second set of configurable contact pads from among the plurality of configurable contact pads is reassigned to the BB functional block in the second mode of operation.

14. The integrated circuit of claim 13, wherein a third set of configurable contact pads from among the plurality of configurable contact pads is reassigned to allow to monitor signals between the RF functional block and the BB functional block in the third mode of operation.

15. The integrated circuit of claim 13, further comprising:
a plurality of pins, each pin from among the plurality of pins being coupled to a configurable contact pad from among the plurality of configurable contact pads.

16. The integrated circuit of claim 9, wherein the switching interconnect module is further configured to:
isolate an input and an output of the RF functional block from another functional block from among the plurality of functional blocks in the first mode of operation,
isolate an input and an output of the BB functional block from another functional block from among the plurality of functional blocks in the second mode of operation, and
couple an input and an output of the RF functional block to the BB functional block in the third mode of operation,
wherein the RF functional block is further configured to provide a clock to the BB functional block in the second mode of operation.

17. An integrated circuit, comprising:
a switching interconnect module;
a plurality of core modules, each of the plurality of core modules being configured to communicate with the switching interconnect module over a corresponding signal pathway from among a plurality of signal pathways, each of the plurality of core modules including:
a second switching interconnect module, and
a plurality of functional modules coupled to the second switching interconnect module, each of the plurality of functional modules being configured to communicate with the second switching interconnect module over a corresponding signal pathway from among a plurality of second signal pathways,
wherein the second switching interconnect module is configurable to couple a signal pathway from among the second plurality of signal pathways to another signal pathway from among the second plurality of signal pathways,
wherein the switching interconnect module is configurable to couple a signal pathway from among the plurality of signal pathways to another signal pathway from among the plurality of signal pathways.

18. The integrated circuit of claim 17, further comprising:
a plurality of configurable contact pads,
wherein each of the plurality of core modules further includes:
a pad allocation module configured to set an operation of a corresponding set of the plurality of configurable contact pads and to arrange a plurality of connections between the corresponding set of configurable contact pads and the second switching interconnect module,
wherein the second switching interconnect module is further configurable to couple the plurality of connections to a functional module from among the plurality of functional modules via its corresponding second signal pathway.

19. The integrated circuit of claim 17, wherein one of the plurality of core modules is configured to operate as a master core module to control overall configuration and operation of another core module from among the plurality of core modules, the other core module being configured to operate as a slave core module.

20. The integrated circuit of claim 19, wherein the master core module is configured to provide an instruction and a parameter of a testing routine to the slave core module.

* * * * *